(12) United States Patent
Kamiya et al.

(10) Patent No.: US 7,244,117 B2
(45) Date of Patent: Jul. 17, 2007

(54) METHOD FOR MOLDING RESIN MEMBER AND INJECTION MOLDING APPARATUS

(75) Inventors: Kouji Kamiya, Okazaki (JP); Toshiaki Kondoh, Okazaki (JP); Syuuichi Hazama, Okazaki (JP); Takanori Tanaka, Toyota (JP); Kosyun Fujiwara, Okazaki (JP)

(73) Assignees: Daiwa Kasei Industry Co., Ltd., Aichi (JP); Toyota Jidosha Kabushiki Kaisha, Aichi (JP)

( * ) Notice: Subject to any disclaimer, the term of this patent is extended or adjusted under 35 U.S.C. 154(b) by 284 days.

(21) Appl. No.: 10/473,396

(22) PCT Filed: Apr. 1, 2002

(86) PCT No.: PCT/JP02/03272

§ 371 (c)(1),
(2), (4) Date: Sep. 30, 2003

(87) PCT Pub. No.: WO02/078926

PCT Pub. Date: Oct. 10, 2002

(65) Prior Publication Data

US 2004/0101586 A1    May 27, 2004

(30) Foreign Application Priority Data

Mar. 30, 2001    (JP)  ............................... 2001-099262
Jun. 19, 2001    (JP)  ............................... 2001-184571

(51) Int. Cl.
*B29C 45/53*      (2006.01)
(52) U.S. Cl. .................... 425/542; 425/450.1; 425/562

(58) Field of Classification Search ................. 425/542
See application file for complete search history.

(56) References Cited

U.S. PATENT DOCUMENTS 3,592,887 A      7/1971    Edwards (Continued)

FOREIGN PATENT DOCUMENTS

DE      15 09 562 A1      6/1969

(Continued)

OTHER PUBLICATIONS

Patent Abstracts of Japan, vol. 012, No. 061, Feb. 24, 1988, & JP 62 207613 A, Sep. 12, 1987, and English Abstract thereof.

(Continued)

*Primary Examiner*—Christina Johnson
*Assistant Examiner*—Monica A Huson
(74) *Attorney, Agent, or Firm*—Townsend & Banta

(57) ABSTRACT

An injection molding apparatus used comprises a molten resin injector 15 for injecting a molten resin, and a die 12 connected to the molten resin injector and communicating with the molten resin injector so that the molten resin is injected into the die. A cavity having a prescribed shape is formed within the die in order to mold the injected molten resin into the prescribed shape. An opening of the die for guiding the molten resin to the outside is blocked so as to confine a molding object as an object for molding the resin member. A plate member 10 as a molding object is compressed onto the die 12, and the molten resin is injected into the die while compressing the molding object. The molten resin is adhered on the molding object by being guided from the opening, and a solidified resin member comprising the solidified molten resin is bonded on the surface of the molding object. Consequently, the resin member having a prescribed shape is readily and promptly formed on the surface of the molding object.

10 Claims, 13 Drawing Sheets

U.S. PATENT DOCUMENTS

| | | | | |
|---|---|---|---|---|
| 3,956,768 | A | * | 5/1976 | Covington .................... 360/92 |
| 4,008,029 | A | * | 2/1977 | Shokite ....................... 425/157 |
| 4,688,752 | A | | 8/1987 | Barteck et al. |
| 4,783,298 | A | * | 11/1988 | Oda ........................... 264/155 |
| 4,943,179 | A | | 7/1990 | Horiki et al. |
| 5,389,331 | A | * | 2/1995 | Uehara et al. ............... 264/513 |
| 5,607,640 | A | | 3/1997 | Hendry ....................... 264/572 |
| 5,618,567 | A | * | 4/1997 | Hara et al. .................. 425/111 |
| 6,083,433 | A | * | 7/2000 | Kikuchi et al. ............... 264/39 |
| 6,120,274 | A | | 9/2000 | Gerig et al. |

FOREIGN PATENT DOCUMENTS

| | | |
|---|---|---|
| DE | 16 71 807 B | 12/1971 |
| DE | 21 41 278 B | 9/1972 |
| DE | 26 14 280 A1 | 10/1977 |
| DE | 33 41 210 A1 | 5/1985 |
| DE | 195 04 828 A1 | 8/1996 |
| EP | 0 673 742 A | 9/1995 |
| EP | 0 738 578 A | 10/1996 |
| EP | 0 845 340 A | 6/1998 |
| EP | 0 913 246 A | 5/1999 |
| FR | 1 080 271 A | 8/1967 |
| FR | 2 531 005 A | 2/1984 |
| FR | 2 649 749 A | 1/1991 |
| FR | 0 738 578 A | 10/1996 |
| GB | 1 080 271 A | 8/1967 |
| JP | 161217 | 3/1989 |
| JP | 1317734 | 12/1989 |
| JP | 3-53915 | 3/1991 |
| JP | 6039874 | 2/1994 |
| JP | 0 673 742 A | 9/1995 |
| JP | 7308939 | 11/1995 |
| JP | 8039581 | 2/1996 |
| JP | 9035338 | 2/1997 |
| JP | 2000071283 | 3/2002 |

OTHER PUBLICATIONS

Patent Abstracts of Japan, vol. 014, No. 393, Aug. 24, 1990, & JP 02 147432 A, Jun. 6 , 1990, and English Abstract thereof.

Patent Abstracts of Japan, vol. 1996, No. 06, Jun. 28, 1996 & JP 08 039581A, Feb. 13, 1996.

Patent Abstracts of Japan, vol. 012, No. 061, Feb. 24, 1988 & JP 62 207613 A, Sep. 12, 1987.

Patent Abstracts of Japan, vol. 012, No. 292, Aug. 10, 1988 & JP 63 069612A, Mar. 29, 1988.

Patent Abstracts of Japan, vol. 006, No. 045, Mar. 20, 1982 & JP 56 161133A, Dec. 11, 1981.

Patent Abstracts of Japan, vol. 014, No. 393, Aug. 24, 1990 & JP 02 147432 A, Jun. 6, 1990.

Patent Abstracts of Japan, vol. 017, No. 493, Sep. 7, 1993 & JP 05 124065 A, May 21, 1993.

Patent Abstracts of Japan, vol. 1997, No. 06, Jun. 30, 1997 & JP 09 029786 A, Feb. 4, 1997.

* cited by examiner

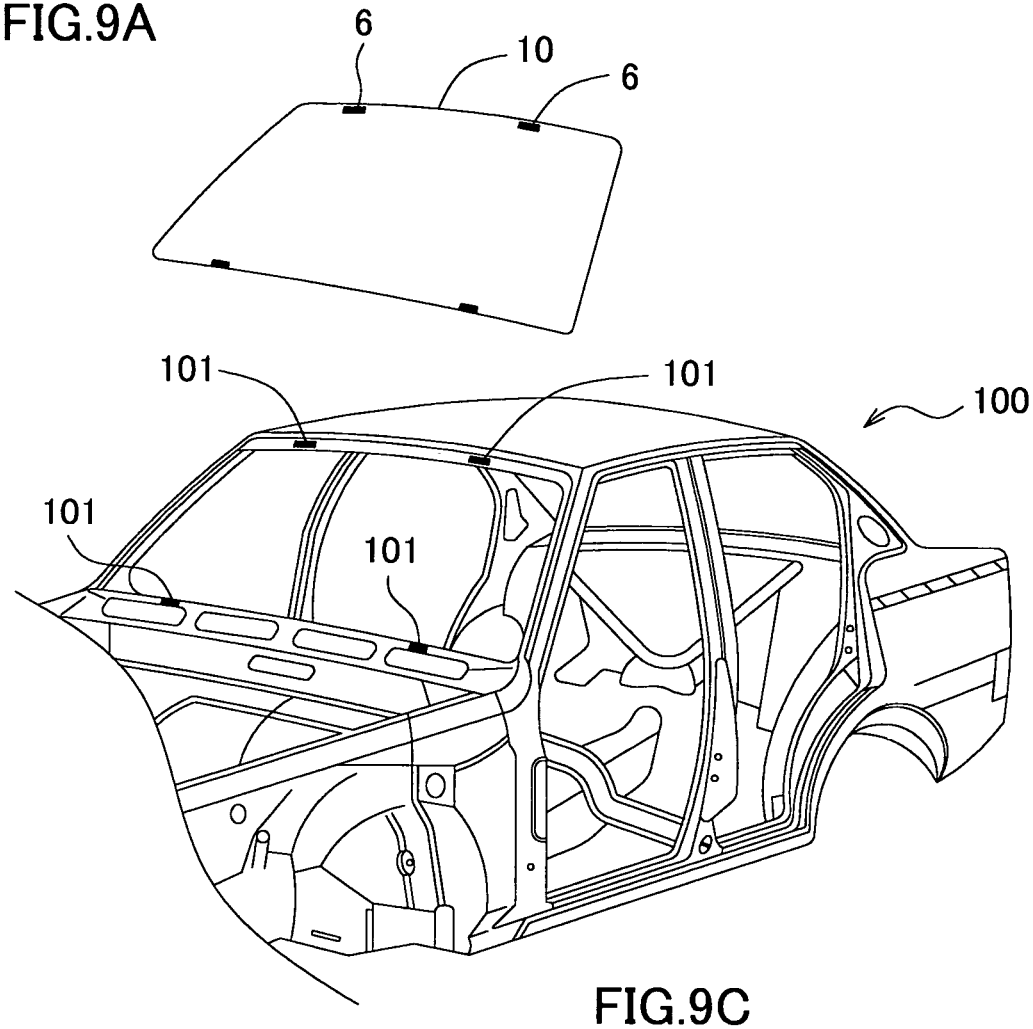
FIG.9A
FIG.9C
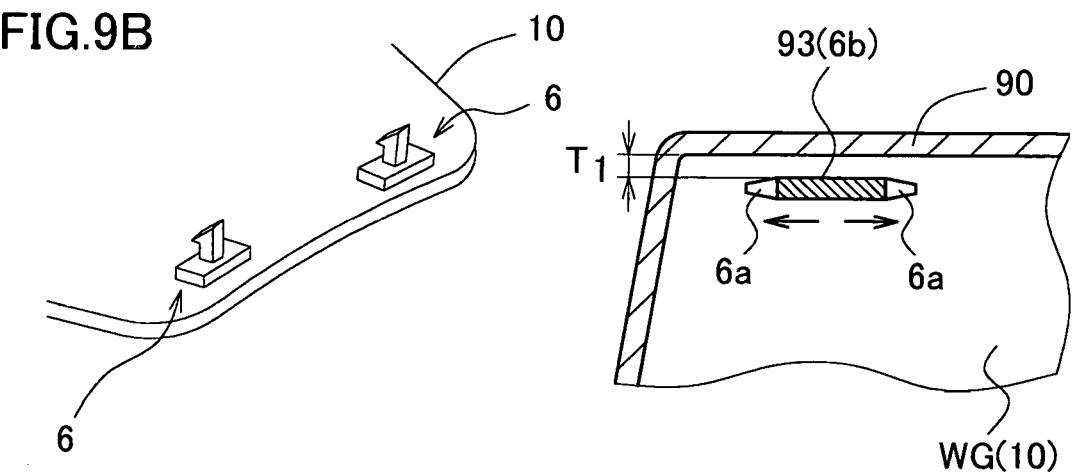
FIG.9B

METHOD FOR MOLDING RESIN MEMBER AND INJECTION MOLDING APPARATUS

TECHNICAL FIELD

The present invention relates to a method for molding a resin member and an injection molding apparatus.

BACKGROUND ART

When a resin member is fixed to a molding object such as a glass, the resin member is usually molded into a prescribed shape using a molding apparatus followed by fixing the molded resin member onto the molding object using an adhesive or a clamping member. Fixing the resin member is required, for example, when a vehicle component such as a vehicle glass as an wind shield glass is attached to the body of the vehicle. While the vehicle glass is usually bonded to the vehicle frame using an adhesive, the glass should be held to the body by some means before adhesive strength of the adhesive becomes sufficiently strong. In a conventional method for holding the glass, a special holding member (resin member) such as a clip is fixed to the glass, and the holding member is locked to the body. Accordingly, a molded holding member was prepared before fixing the holding member to the glass in the conventional method, and the molded member is fused to the glass using a ultrasonic welding machine.

The problem to be solved by the present invention is to provide a method for readily attaching a molded resin member on the surface of a molding object, and an injection molding apparatus to be used for this purpose.

DISCLOSURE OF THE INVENTION

The present invention for solving the problems above provides:

a method for molding a resin member using an injection molding apparatus comprising:

a molten resin injector for injecting a molten resin; and a die connected to the molten resin injector and communicating with the molten resin injector so that the molten resin is injected into the die, a cavity having a prescribed shape being formed within the die in order to mold the injected molten resin into the prescribed shape, wherein a molding object is compressed onto the die having an opening for guiding the molten resin to the outside while blocking the opening so that the molding object as an object for molding the resin member is confined therein, the compressed molten resin being adhered to the molding object so as to be guided from the opening by injecting the molten resin into the die, the resin member comprising the solidified molten resin molded so as to be directly adhered on the surface of the molding object, the molten resin being injected into the cavity while maintaining an injection pressure of the molten resin of 350 kg/cm$^2$ or less.

According to the method above, the resin member having a prescribed shape can be readily and promptly formed on the surface of the molding object. Conventional methods comprise multisteps of once forming a resin member by injection molding, applying an adhesive on the surface of a molding object, and bonding the resin member formed onto the molding object. However, these steps can be performed at once in the method of the present invention, enabling the time for molding the resin member to be largely diminished.

The effect of forming the resin member as described above becomes evident when the method of the present invention is applied to vehicle glass members (for example a wind shield glass). For example, while a front glass is fixed to a vehicle frame with an adhesive in the conventional manufacturing process of vehicles, a clip as a holding member was attached to a glass member by bonding or clamping, and a part of the clip was inserted into holes formed in the vehicle frame. According to the method of the present invention described above, however, the clip is integrally formed with the glass member to enable the clip to be formed on the glass member within a quite short period of time while saving the number of steps such as a clip management step. The effect of the present invention is quite large since no inventory control is required.

The present invention also provides an injection molding apparatus comprising:

a molten resin injector for injecting a molten resin; and a die having a cavity of a prescribed shape formed therein in communication with the molten resin injector so as to inject the molten resin within the cavity, the cavity comprising an opening for guiding the molten resin to the outside from the cavity, the die comprising the opening for guiding the molten resin to the outside, a molding object being compressed onto the die while placing a resin member on the molding object as an object of molding by blocking the opening, the molten resin guided from the opening being closely adhered on the molding object by injecting the compressed molten resin into the die, and allowing a solidified resin member formed by solidifying the molten resin to be bonded on the surface of the molding object. The present invention provides an apparatus for favorably applying the method of the present invention having the constitution as described above.

The injection molding apparatus described above may be constituted so as to have an integrated main unit formed by providing an injection plunger for injecting the molten resin from the molten resin injector by moving in a prescribed direction and an injection actuator for allowing the injection plunger to move by being directly or indirectly coupled with the injection plunger, the injection molding apparatus further comprising, as a separate unit from the main unit, an injection driving source for feeding a first medium to the injection actuator by being coupled with the injection actuator by means of a flexible first medium feeding member for feeding a driving medium (named as the first medium hereinafter) for energizing the injection actuator, the main unit being able to move relative to the injection driving source through the first medium feed member.

The main unit becomes lightweight by separately forming the main unit from the driving source for energizing the injection actuator. For example, the driving force required for a transfer device can be reduced when the main unit is used after transferring the main unit with the transfer device, thereby enabling various transfer devices to be employed to enable selection ranges of the transfer device to be expanded while allowing running cost to be reduced.

Practically, an injection air cylinder may be employed as the injection actuator, and an injection air feed device for feeding air to the injection air cylinder may be provided as an injection driving source. Furthermore, the injection air cylinder may communicate with the injection air feed device through an injection air duct as a first medium feed member in order to feed air by the injection air feed device. The main unit can be devised to be lightweight to an extent capable of carrying by man power by providing the air cylinder at a portion responsible as a resin feed driving source, thereby making the machine to be quite functional as a manually operable tool.

The main unit may comprise a grasping member for allowing an operator to grasp the injection molding apparatus. The operator can delicately adjust the molding position and readily perform molding work of the resin member irrespective of working sites by providing such grasping member.

BRIEF DESCRIPTION OF THE DRAWINGS

FIG. 9A illustrates an example of bonding of the solidified resin member to a vehicle glass.

FIG. 9B is a perspective view showing the enlarged main part in FIG. 9A.

FIG. 9C illustrates how the resin member functions as a temporary holding stopper to the wind glass.

BEST MODE FOR CARRYING OUT THE INVENTION

Figure 1:
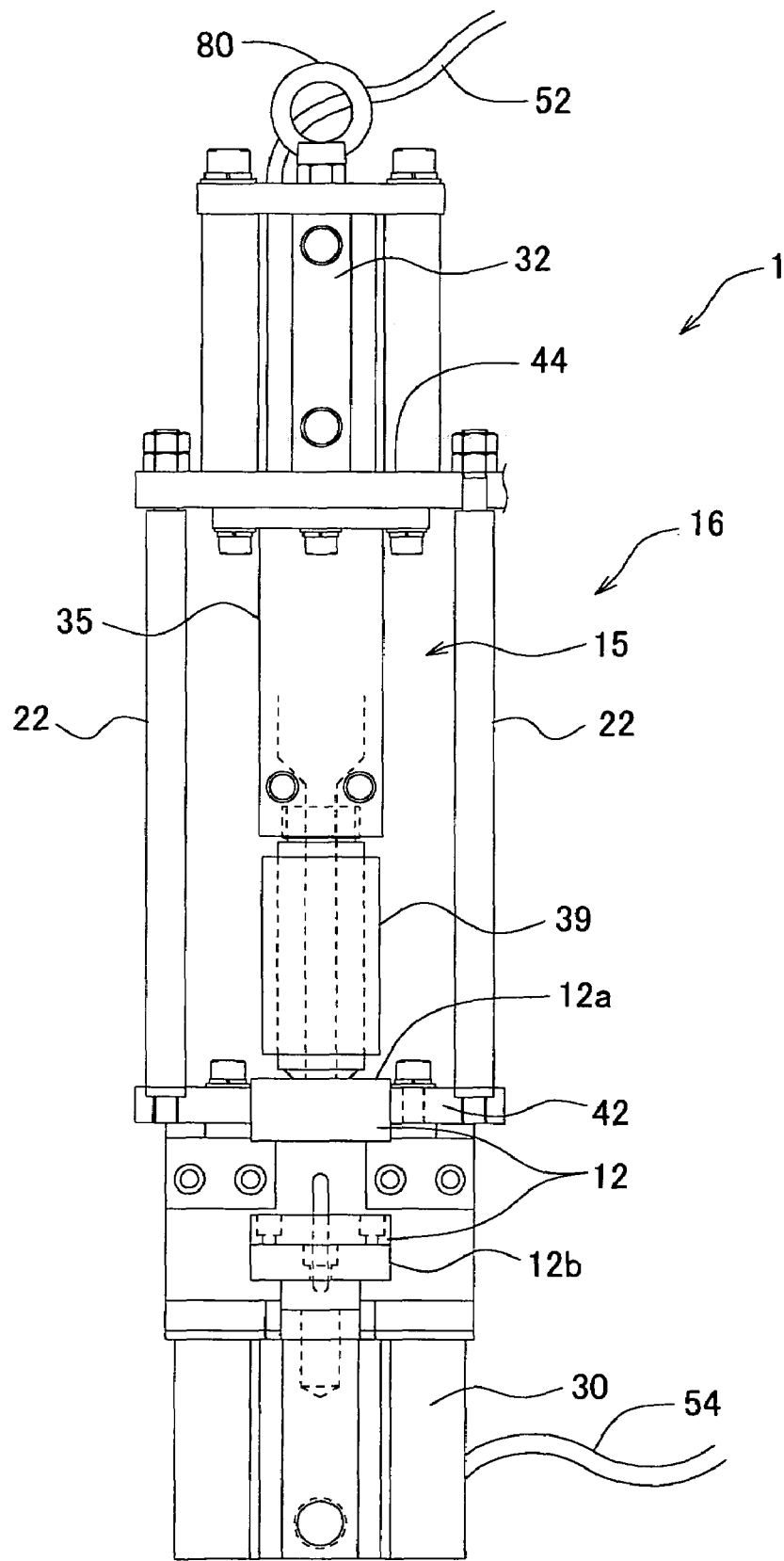
FIG. 1 is a front view showing an example of the injection molding apparatus of the present invention.
Figure 2:
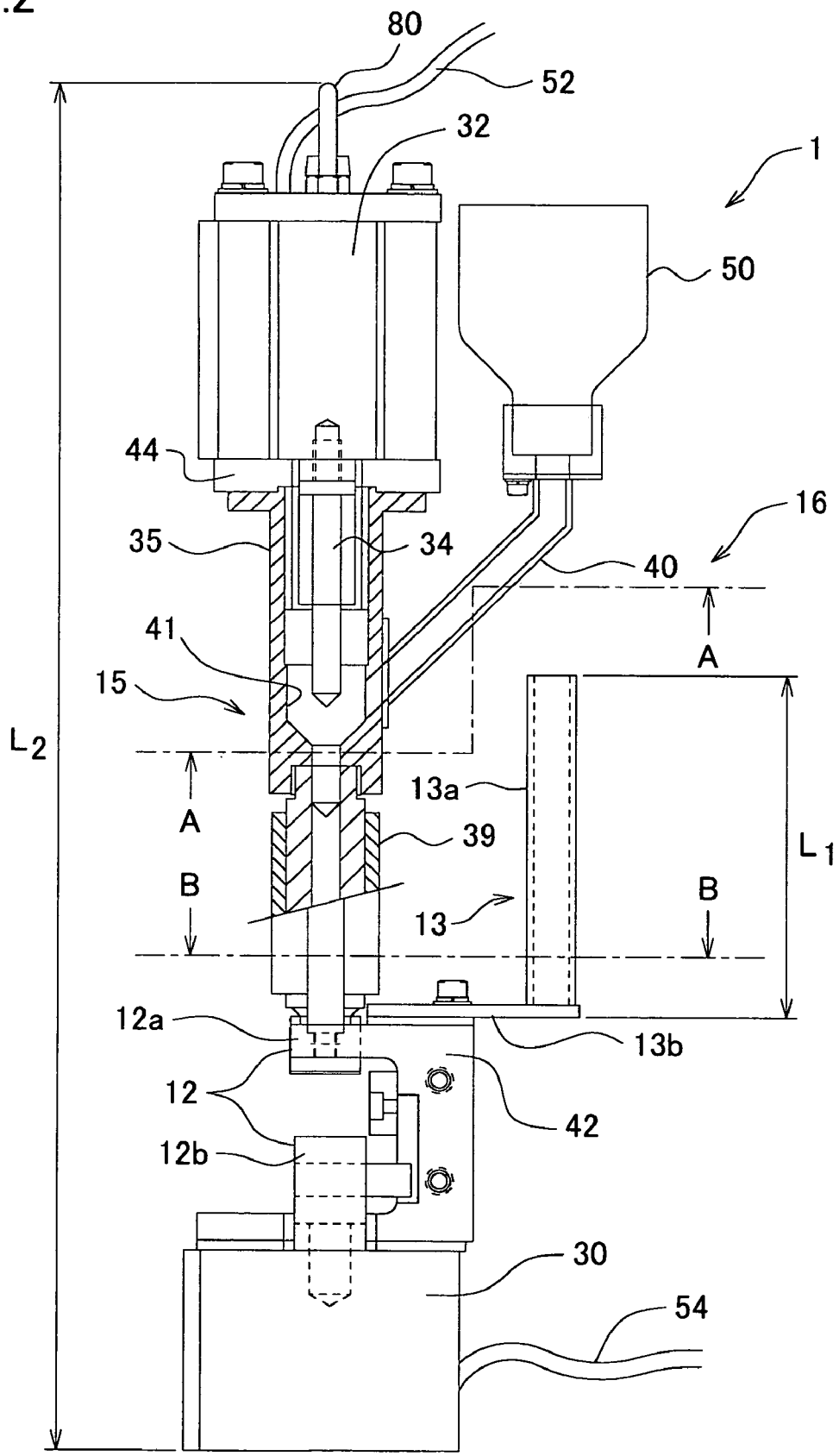
FIG. 2 is a side view of the partial cross section of the injection molding apparatus shown in FIG. 1.

The best mode for carrying out the present invention will be described hereinafter with reference to the drawings. FIG. 1 shows a front view constituting a part of the injection molding apparatus of the present invention, and FIG. 2 shows a side view thereof. As shown in FIG. 1, the injection molding apparatus 1 comprises a molten resin injector 15 for injecting a molten resin, and a main unit 16 having a die 12 connected to the molten resin injector 15 and formed so that the molten resin is injected into the die. The die comprises a cavity with a prescribed shape therein so that the injected molten resin is molded into the shape of the cavity. Injection of the resin as used in this invention includes an embodiment in which the injection pressure is large, as well as an embodiment in which the injection pressure is small, or so called flow-through injection.

As shown in FIG. 1, the injection molding apparatus 1 comprises the die 12 and molten resin injector 15 (named as an injector 15 hereinafter) integrated therewith. The die 12 comprises therein a cavity 14 (see FIG. 6) communicating with the inside of the injector 15, and the molten resin is injected so as to fill the cavity 14. Examples of the injector 15 available include plunger type, pre-practice type and screw type injectors. The die 12 is fixed with a die fixing member 42 as shown in FIG. 2, and the die fixing member 42 and actuator fixing member (an air cylinder fixing member 44) for fixing the an injection air cylinder 32 as an injection actuator are monolithically fixed with tie-bars 22. While a standard cylinder having a driving shaft as shown in this embodiment may be used as the injection air cylinder 32 (and a clamping air cylinder 30 to be described hereinafter), air cylinders known in the art that can be conjectured by those skilled in the art such as a special cylinder (such as a rodless cylinder) may be also used.

The injector 15 comprises therein an injection plunger 34 coupled with a driving part (for example a driving shaft) of the injection air cylinder 32, and the molten resin is injected into the die 12 with the injection plunger 34 moving by being driven with the injection air cylinder 32. The die 12 is monolithically fixed with the injector 15 by means of the die fixing member 42, air cylinder fixing member 44 and tie-bars 22, which comprises a part of the main unit 16.

Figure 3A:
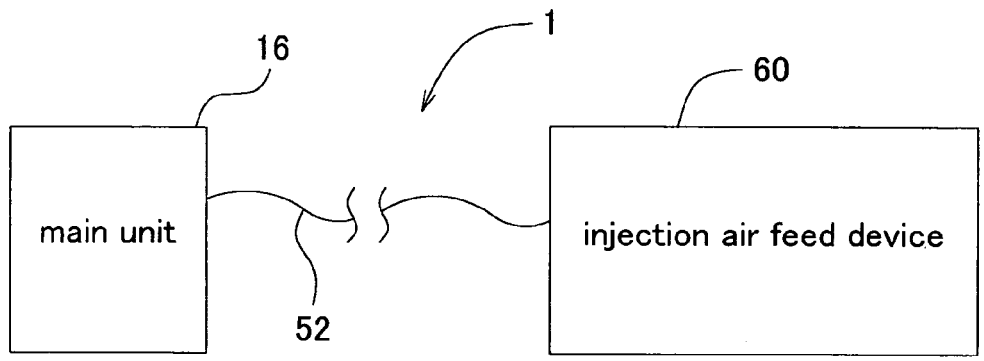
FIGS. 3A to 3C schematically illustrate examples of the constitutions of the injection molding apparatus.

As shown schematically in FIG. 3A, the main unit 16 comprises an injection air feed device 60 (compressor, tank, after-cooler and the like) as an injection driving source for feeding air as a first medium to the injection air cylinder 32 (see FIG. 1). An injection air duct 52 as a first medium feed member couples the injection air cylinder 32 and injection air feed device 60 so that they are communicating with each other. Various materials such as metals and non-metals (for example resins) may be used for the injection air duct 52, which are desirably flexible. Particularly, operability by an operator is improved due to lightweight by using non-metallic materials (such as resins). However, the clamping actuator is not restricted thereto, and may be a motor, hydraulic cylinder and the like. For example, when the motor is employed as the actuator, an electric power supply source (electric source) may be used as the injection driving source, and a conductive member (such as a wire) may be used as the first medium feed member (the first medium is electricity in this case). When the hydraulic cylinder is employed as the injection actuator, a hydraulic pump may be used as the injection driving source (the first medium is an oil in this case).

The main unit 16 is movable relative to the injection driving source (or the injection air feed device 60) through the injection air duct 52. Since the injection air feed device 60 is provided as a separate unit from the main unit 16, only the main unit 16 is movable without transferring the injection air feed device 60. In other words, the injection air feed device 60 comprising the compressor, tank and after cooler and having a considerable weight is not required to be moved. Accordingly, the main unit 16 can be manually transferred without using any special transfer machine since the main unit itself is quite lightweight. A mechanical transfer device such as a robot having a small driving force is also available for the main unit 16, enabling selection ranges of the transfer device to be expanded. Furthermore, since a minute quantity of electrical energy is required for mechanical transfer, the transfer cost (for example the cost of electricity) may be saved.

Figure 3B:
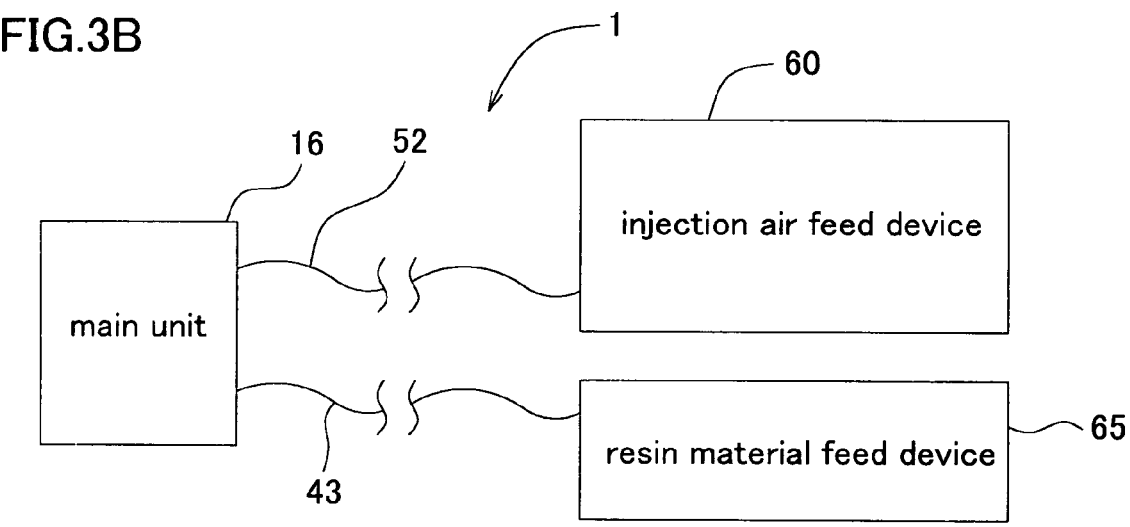

As shown in FIG. 2, the main unit 16 comprises a hopper 50 as a starting material feed part, which communicates with a material tank 41 provided at the molten resin injector 15 through a material feed passageway 40. The starting material is supplied by feeding a resin material into the hopper 50. While the starting material is supplied through the hopper 50 in FIG. 2, supply of the material is not restricted thereto. For example, the material may be automatically or semi-automatically supplied with a resin material feed device 65 (see FIG. 3B) comprising a flexible hose of a material feed passageway 43 and independently provided from the main unit 16 (for example, the resin material feed device 65 may be formed as a hopper, and the resin material is automatically supplied by sensing shortage of the resin material; or the feed port of the hopper may be opened and closed by operating a switch electrically connected to the resin material feed device 65 that is provided at the main unit 16 or provided independently from the main unit 16). The hopper 50 may be omitted by independently providing the resin material feed device 65 from the main unit 16, enabling the main unit 16 to be further lightweight. Otherwise, the main unit 16 becomes readily movable by constructing the material feed passageway 43 with a flexible member (for example a hose member made of a resin).

Figure 6:
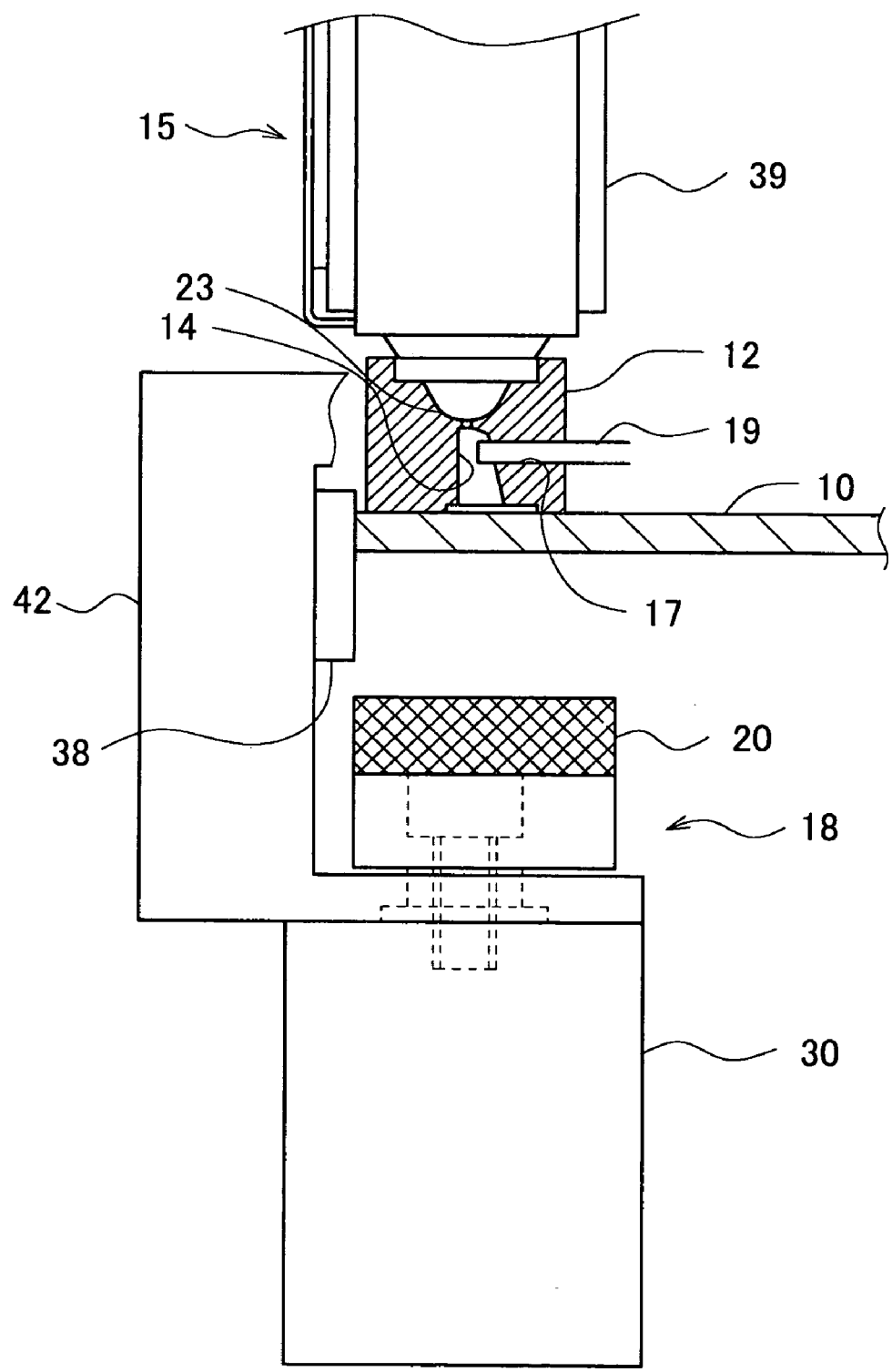
FIG. 6 is an enlarged view showing the main part of FIG. 1.

The resin material supplied to the hopper 50 is stored in the material tank 41, then transferred to a heating cylinder 39 as a plasticizing apparatus having a heater, and is converted into a molten resin by being heated by the heating cylinder 39. As shown in FIG. 6, the resin material converted into the molten resin is injected from a nozzle 23 to the cavity 14 provided within the die 12 by the movement of the injection plunger 34 after melting, and the cavity 14 is filled with the molten resin. The nozzle 23 is formed so that the opening area of the nozzle 23 is reduced at the injection side, and is constructed so that the injected resin is tapered, or so that the resin is injected so as to be converged in one direction. The transfer speed and driving force of the injection cylinder 34 may be controlled by adjusting the pressure, flow rate and speed of air supplied to the injection air cylinder 32. For example, the condition of feed air may be controlled by an actuator control method known in the art by providing a pressure control valve, flow rate control valve and flow speed control valve at a part of the injection air duct 52 in order to set the piston (rod) transfer speed and driving force of the injection air cylinder 32 at arbitrary values.

The material of such molten resin available is, for example, polypropylene (however, the resin is not restricted thereto, and examples of the resin include synthetic resins known in the art mainly comprising engineering plastics such as polyacetal, polyamide, polycarbonate, modified polyphenylene oxide, polybutylene terephthalate, polysulfone and polyphenylene sulfide, and other common plastics).

The injection pressure of the molten resin from the molten resin injector 15 to the cavity 14 is adjusted to a desired value. Too small injection pressure may cause insufficient filling of the molten resin. When the pressure is too large, on the other hand, the clamping force for preventing the resin from leaking from between the molding object (plate member 10) and die 12 should be increased, causing potential danger of damaging the molding object. Too large injection pressure may also cause leak of the molten resin from the gap between the die 12 and molding object.

An opening is provided at the die 12 so as to be able to guide the molten resin to the outside of the cavity. The plate member 10 (for example a glass member) that serves as the molding object is provided for molding the resin by blocking the opening so that the plate member serves as a part of the inner wall of the die 12. The plate member 10 that serves as the molding object is compressed onto the die 12. The molten resin is closely adhered on the molding object (plate member 10) while being guided from the opening by injecting the molten resin into the die 12 while keeping the compressed state of the plate member, thereby bonding a solidified resin member formed by solidifying (for example solidifying by cooling) the molten resin on the surface of the molding object. Consequently, the step for molding the solidified resin member by injection molding, and the step for bonding the solidified resin member to the molding object are simultaneously performed, enabling the time required for molding the resin member to be largely reduced. The material of the molding object is not restricted to the glass, and may be an organic substance such as a resin, wood, natural leather, synthetic leather and paper, or a mixture of at least two substances selected therefrom. The molding object may be also an inorganic substance such as a metal or non-metal, and a mixture of the metal and non-metal. A mixture of an organic substance and inorganic substance may be also available. The method according to the present invention is particularly effective when the resin member is molded on a fragile object such as a glass.

Figure 8A:
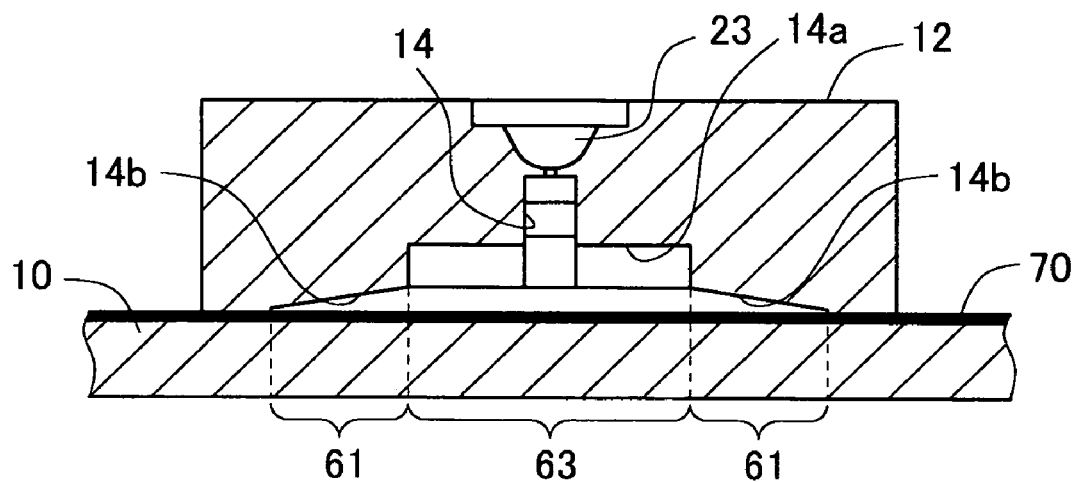
FIG. 8A is a cross section showing an example of the shape of the cavity.
Figure 8B:
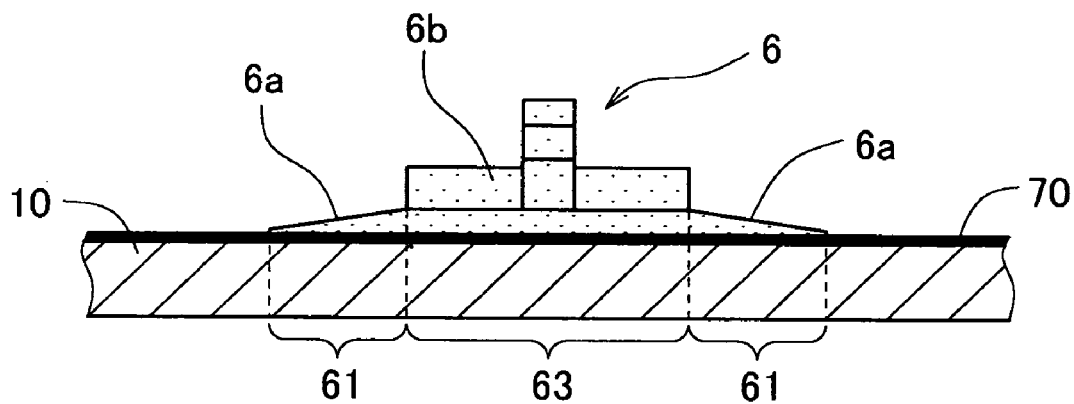
FIG. 8B is a cross section showing an example of the solidified resin member molded in the cavity in FIG. 8A.

As shown in FIG. 8A, the cavity 14 formed in the die 12 comprises a perfectly filling part 14a communicating the molten resin injector 15 (See FIG. 1) for being perfectly filled with the molten resin, and an imperfect filling permissible part 14b communicating the perfectly filling part 14a to allow the molten resin to permeate from the perfectly filling part 14a while permitting the molten resin to imperfectly fill. As shown in FIG. 8B, the contact face (the contact face in a perfectly molded resin contact region 63) of the solidified resin member 6 with the molding object at a part (a perfectly molded resin part 6b) formed in the perfectly filling part 14a maintains an area required for bonding to the plate member 10 that serves as the molding object, and a sufficient bonding force is given to the contact face when at least the perfectly molded resin part 6b is formed. Furthermore, the bonding force is reinforced by the contact face (the contact face at an imperfectly molded resin contact area 61) with the molding object of the part (an imperfectly molded resin part 6a) formed by the imperfect filling permissible part 14b in the solidified resin member 6.

The imperfect filling permissible part 14b extends from the periphery of the perfectly filling part 14a to the outside thereof, and is formed so that the cross sectional area perpendicular to the extending direction (in other word, the direction of advance of the resin member in the imperfect filling permissible part) decreases in accordance with the distance from the periphery. The extending direction in FIG. 8A is parallel to the surface of the molding object (plate member 10). The imperfect filling permissible part 14b is outwardly extended from at least a part of the periphery of the perfectly filling part 14a so that the bonding area between molding object and molded resin member increases. The bonding strength is reinforced by increasing the bonding area between the resin member and molding object by providing the imperfect filling permissible part. Actually, the cavity 14 is formed so that the gap between the inner wall of the cavity 14 in the imperfect filling permissible part 14b and the surface of the molding object (plate member 10) is narrowed in accordance with the distance from the boundary between the imperfect filling permissible part 14b and perfectly filling part 14a as shown in FIG. 8A. The molten resin can be hardly permeated into the portion remote from the nozzle 23 when the molten resin is injected into the cavity 14, and permeation of the molten resin becomes further difficult as the gap in the cavity 14 is narrowed. The cavity 14 in FIG. 8A is constructed so that the distance from the tip of the nozzle is larger in the imperfect filling permissible part 14b than in the perfectly filling part 14a. In other words, since the molten resin invades the imperfect filling permissible part 14b after filling the perfectly filling part 14a, the injection pressure required for filling the entire imperfect filling permissible part 14b is larger than the injection pressure capable of filling the perfectly filling part 14a. In addition, since the gap between the inner wall of the cavity 14 and plate member 10 is narrowed (or the cavity 14 is formed so that the cross section of the cavity (the cross section of the molten resin passageway) is reduced in the direction of advance of the molten resin as the distance from the nozzle 23 increases), a differential pressure is generated between the minimum injection pressure (called as a required injection pressure for the perfectly filling part hereinafter) for enabling the perfectly filling part 14a to be fully filled and the minimum injection pressure (called as the minimum injection pressure for filling hereinafter) for perfectly filling the imperfect filling permissible part 14b (in other words, the differential pressure between the minimum injection pressure when the molten resin starts to leak from the cavity 14 (called as a leak initiating injection pressure hereinafter) and the injection pressure for filling the perfectly filling part increases). Accordingly, the injection pressure of the molten resin injector 15 may be determined with some margin.

Figure 8C:
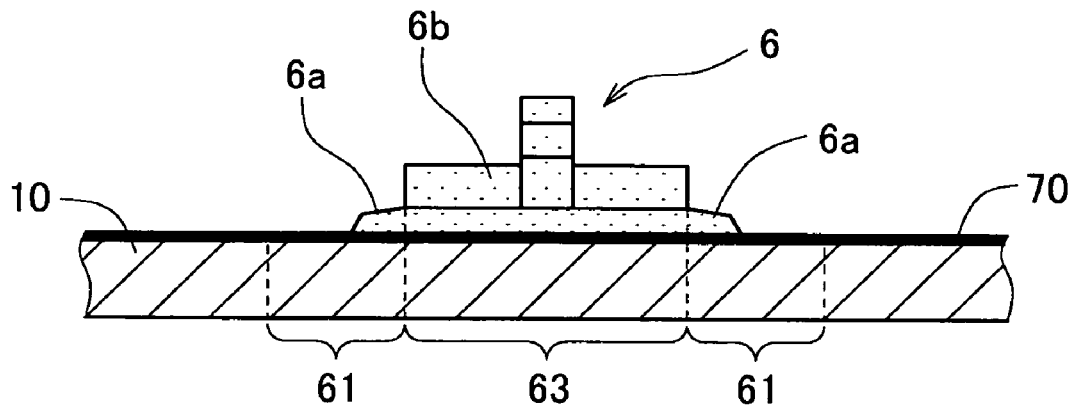
FIG. 8C is a cross section showing another example of the solidified resin member molded in the cavity in FIG. 8A.

FIG. 8B shows an example in which the resin is filled by invading into the entire imperfect filling permissible part 14b of the cavity 14, and FIG. 8C shows an example in which the resin invades in only a part of the imperfect filling permissible part 14b, and does not arrive at the tip of the imperfect filling permissible part 14b. The former corresponds to injection of relatively a large quantity of the resin, while the latter corresponds to injection of relatively a small quantity of the resin. While the injection volume of the injector by one stroke is substantially constant in the injection mechanism employing a screw type injector that injects the resin after metering with a screw, the injection volume may be irregular in a plunger type injection mechanism (particularly when the size of the resin molding part is small). Therefore, the imperfect filling permissible part 14b of the cavity 14 may be considered to function as a kind of relief part that permits irregular injection of the resin. The resin is perfectly filled up to the imperfect filling permissible part 14b by one stroke of injection when the plunger mechanism is employed. When the injection volume is in excess, the plunger stops at a latter half of the stroke of the plunger since the injection pressure (compression force of the plunger) is constant, and the resin remaining in the cylinder without being injected can be used for the next injection. While a considerable bonding strength is satisfied once the resin is bonded to the region 63 in FIG. 8B as well as in FIG. 8C, more enhanced bonding strength may be expected by permitting all or a part of the region 61 wider than the region 61 to serve as the resin bonding region.

While the molten resin is injected into the cavity while maintaining the injection pressure of the molten resin low in the present invention, the low pressure as used in the present invention means that pressure is low as compared with the injection pressure (about 1,000 $kg/cm^2$) in the conventional injection molding. For example, the resin is injected while adjusting the injection pressure of the molten resin at 350 $kg/cm^2$ or less (desirably at 200 $kg/cm^2$ or less). This means that the pressure of the molten resin in the cavity is 250 $kg/cm^2$ or less, which is effective when the molding object is a fragile substance such as a glass since the pressure applied on the molding object is also 250 $kg/cm^2$ or less. A pressure exceeding 350 $kg/cm^2$ may break the object when a fragile substance such as a glass is used as the molding object. The minimum injection pressure may be close to 0 $kg/cm^2$, or 50 $kg/cm^2$ or more, so long as the molten is fluid.

The clamping mechanism will be described hereinafter.

Figure 3C:
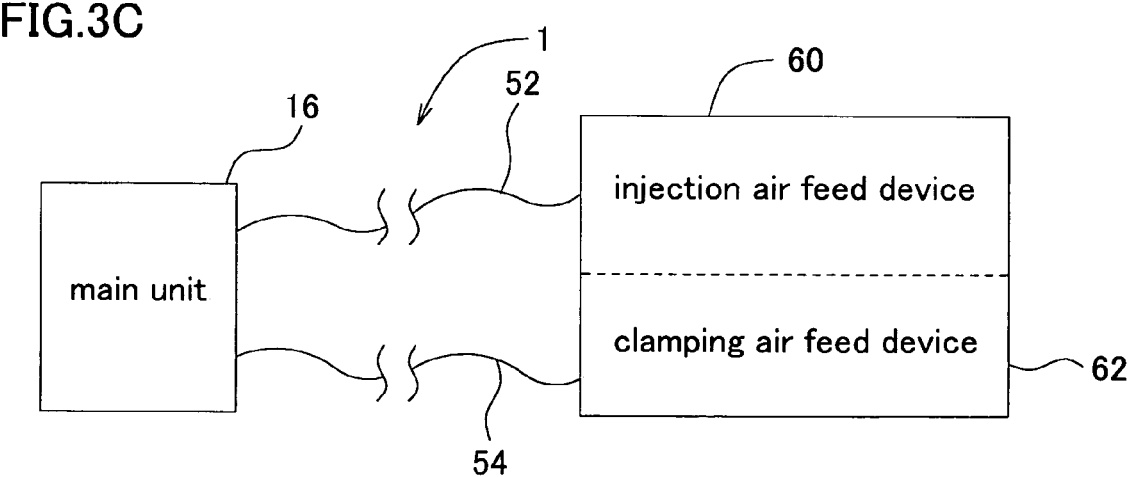
Figure 4:
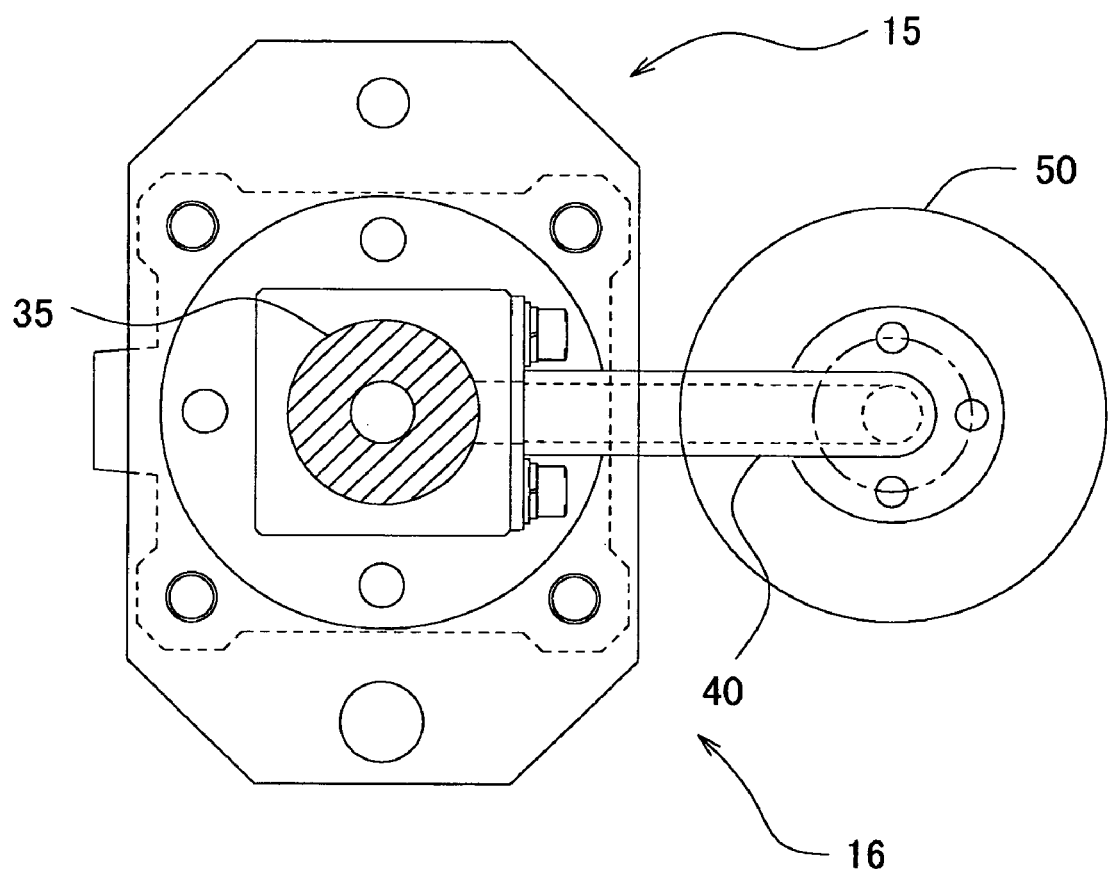
FIG. 4 is a cross section taken on line A—A in FIG. 2.
Figure 5:
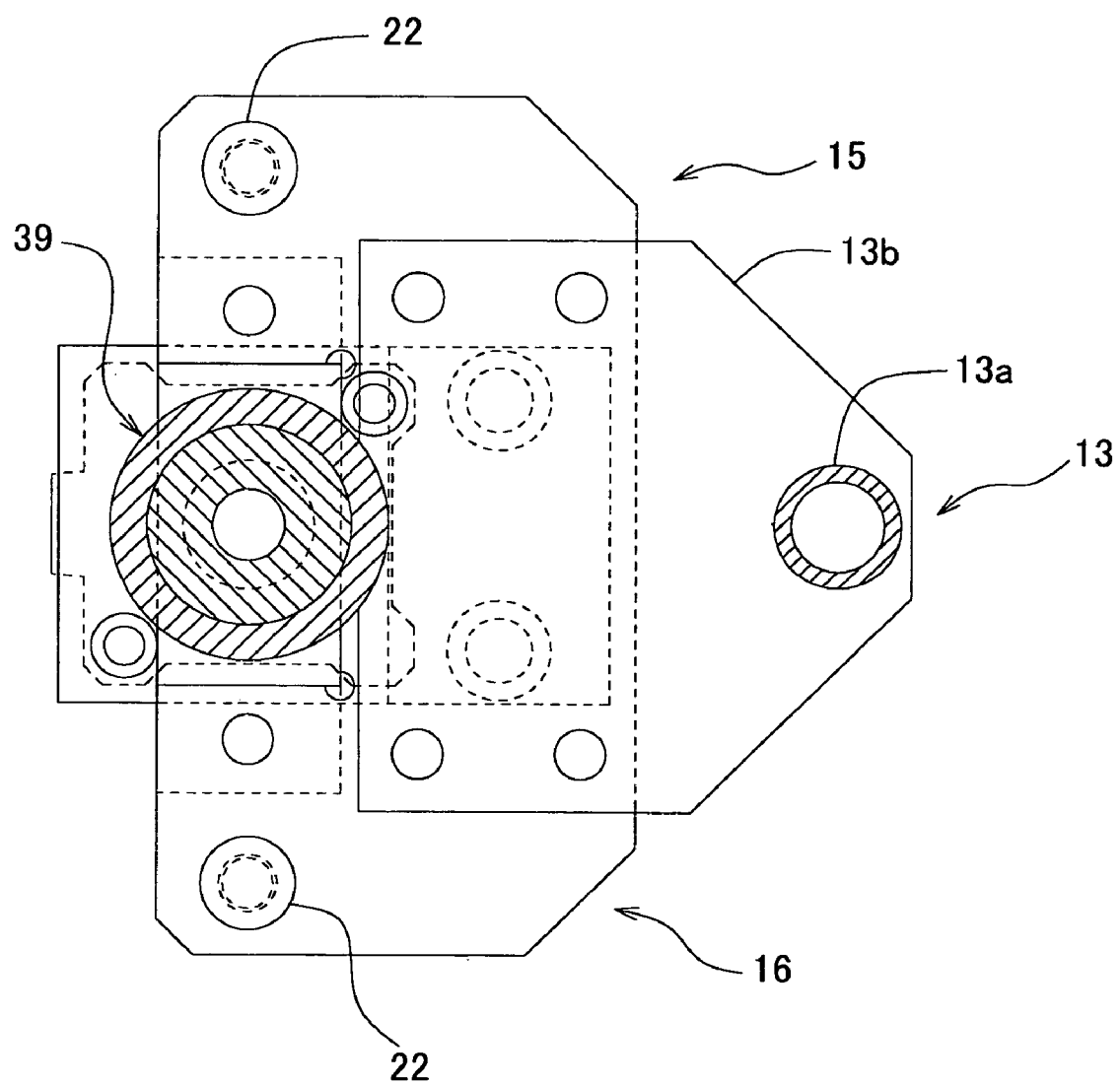
FIG. 5 is a cross section taken on line B—B in FIG. 2.

The clamping mechanism comprises a compression member 18 for compressing the plate member 10 by pushing out toward the die 12 side, and a clamping air cylinder 30 as a clamping actuator that is directly or indirectly coupled with the compression member 18 for allowing the compression member 18 to relatively come close to and remote from the die 12. As shown in FIG. 3C, the clamping air cylinder 30 is coupled with a clamping air feed device 62 (a compressor, tank, after-cooler and the like) as a clamping driving source for feeding air as a second medium through a clamping air duct 54 as a second medium feed member, and air is supplied from the clamping air feed device 62 through the clamping air duct 54. Various materials such as metals and non-metals (for example resins) may be used for the clamping air duct 54. The clamping mechanism becomes lightweight by constructing it using a non-metal (for example a resin), and operability by the operator is improved. The clamping actuator is not restricted to those described above, and a motor and a hydraulic cylinder may be used as in the injection actuator. In this case, the second medium, or the second medium feed member exemplified in the injection actuator may be also used. Using an air cylinder as the clamping actuator may contribute the clamping mechanism to be lightweight and small size as in the case of the injection air cylinder 32 (FIG. 1). While a standard cylinder having a driving shaft as exemplified as the clamping air cylinder 30 (FIG. 6) may be used as in the case of the injection air cylinder 32, any cylinders such as a special cylinder (for example a rodless cylinder) may be used so long as the cylinders are known in the art and readily conjectured by those skilled in the art.

The clamping air feed device 62 (compressor, tank, after-cooler and the like) may be provided as an independent unit from the main unit 16 as in the injection air feed device, and the main unit 16 can be transferred without moving the clamping air feed device, thereby enabling the main unit 16 as a main movable part of the injection molding apparatus 1 to be lightweight while making the injection molding apparatus to be quite functional as a hand tool While the clamping air feed device 62 is independently provided from the injection air feed device 60, they are not always required to be different units. In other words, an air feed device may be simultaneously used for the injection and clamping air cylinders, and the air feed direction may be selected with a flow rate control device (such as an electromagnetic valve).

The compression member 18 is coupled with the driving part (driving shaft) of the clamping air cylinder 30, and comes close to or remote from the plate member 10 by being driven with the clamping air cylinder 30. The plate member 10 is clamped in the direction of thickness by the die 12 fixed relative to the main unit 16 and the compression member 18 that pushes the plate member 10 toward the die 12 by being driven with the clamping air cylinder 30 Consequently, the plate member is fixed to the die 12. Such construction of the clamping mechanism permits the plate member 10 to be fixed to the die 12 with a given compression force so that the surface of the plate member 10 serves as a part of the inner wall of the cavity 14.

The following synergetic effect may be expected by employing the glass member as the molding object as described above, and by adjusting the compression pressure. Since the glass member may be broken or suffer a sever damage on the surface when the contact pressure between the glass member (for example a vehicle glass member) and the die 12 (for example, applying several tons of the clamping pressure as in the conventional injection molding) is too large, it has been quite difficult to employ, or even to imagine, the glass member as a part of the die. However, this is possible in the present invention by adjusting the shape of the cavity.

A buffer member 20 for reducing physical shocks when the molding object is compressed by the compression member 18 is provided on at least a part of the contact face of the compression member 18 for compressing the molding object. The buffer member may be made of an elastic member (for example a soft elastic member such as a rubber or an elastomer), or a cushioning material such as a resin or cloth (woven or non-woven fabric) may be used. Providing the buffer member 20 permits shocks caused by compression of the compression member 18 onto the plate member 10 may be relieved while effectively preventing the surface of the plate member 10 to be protected from being damaged by using a low hardness member (desirably a soft and elastic member such as a rubber, resin and cloth) as the buffer member.

As shown in FIG. 6, the plate member 10 as the molding object is supplied by being slid in a perpendicular or approximately perpendicular direction relative to the direction for allowing the die 12 to come close to or remote from the compression member 18. The plate member 10 may be supplied by a mechanical method (for example, using a robot for supplying the plate member to a resin molding position while clamping the plate member), or may be manually supplied. The plate member 10 is positioned by making at least a part thereof to contact a positioning member 38 located at the transfer side (for example, positioned by allowing its outer periphery to contact), and is fixed relative to the die 12 by being compressed in the direction of thickness by being clamped with the die 12 and compression member 18. An accurate positioning is possible by positioning the plate member by allowing at least a part thereof to contact while facilitating the positioning work. Particularly, the operator can definitely locate the positioning mark when the plate member 10 is manually supplied.

The total length $L_2$ of the main unit 16 may be determined to be 50 cm or less as shown in FIG. 2. The main unit 16 may become large size and manual transfer becomes difficult when the total length exceeds 50 cm, forcing the installation site and accommodation space to be widened. When the length is too small, on the other hand, the actuator becomes inevitably small that an effective injection pressure and clamping force cannot be obtained. The weight of the main unit 16 may be determined in the rage of 5 to 10 kg. Manual transfer becomes difficult when the weight exceeds 10 kg, while selection of a desirable actuator for realizing desirable functions becomes difficult when the weight is less than 5 kg.

Figure 7:
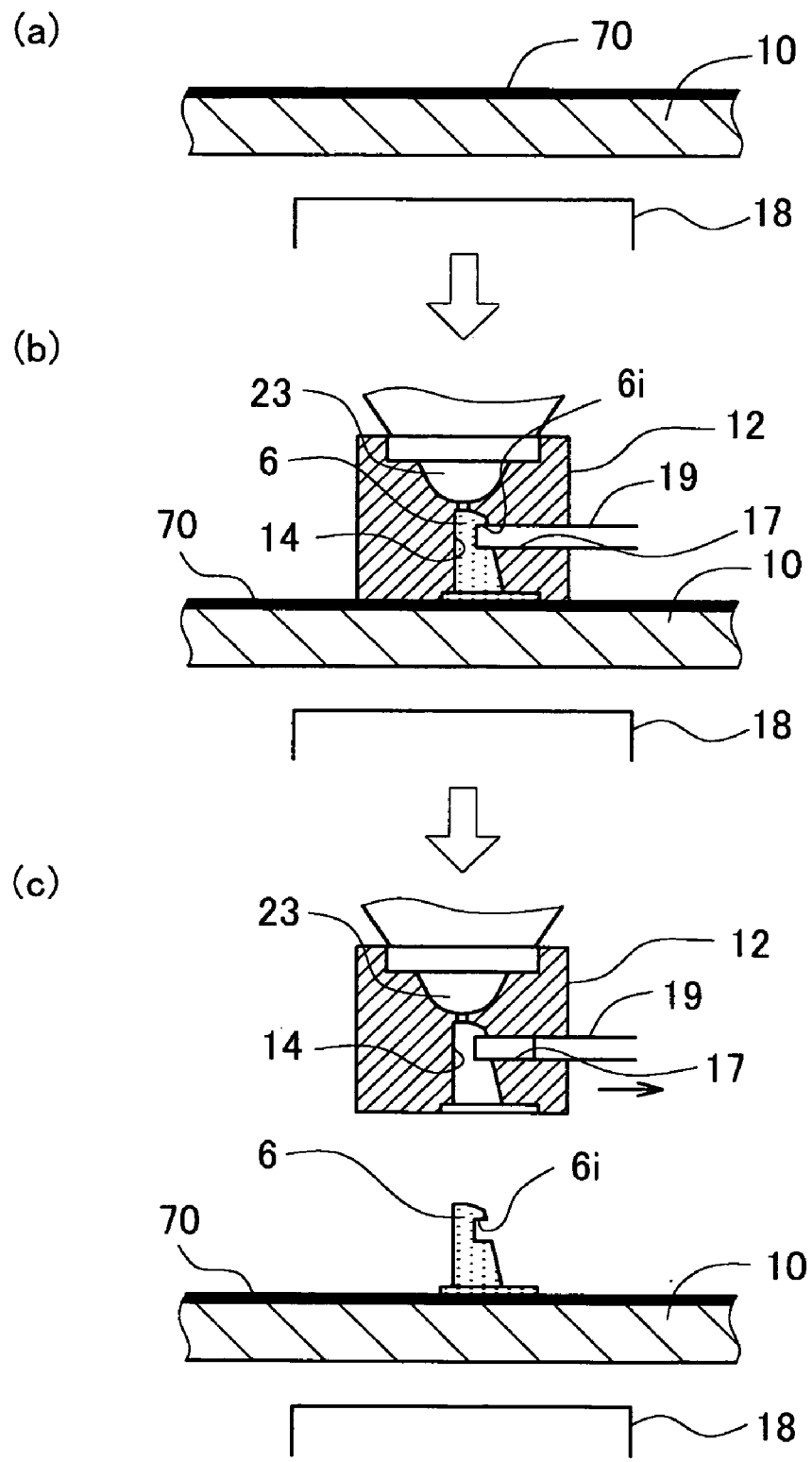
FIG. 7 is a process chart schematically describing the bonding process of the resin member.

While the plate member 10 is clamped in the direction of thickness with the die 12 and compression member 18 as described above, an inner wall is formed in the cavity 14 formed in the die 12 by being compressed by the plate member 10 so that the solidified resin member 6 is molded by being protruded from the plate surface (for example, so as to protrude in an approximately perpendicular direction to the surface of the plate). The solidified resin member 6 is released from the die 12 by allowing the plate member 10 to depart from the die 12 in the vertical direction after solidification (by allowing the plate member 10 to move in the vertical direction (downward in the drawing) as shown in FIG. 6 or 7). Then, the solidified resin 6 spontaneously falls off from the inside of the cavity by the plate member's 10 own weight, when the compression member 18 is allowed to move by the compression air cylinder 30 (or when the compression member departs from the die 12) after completing solidification of the solidified resin member 6. The method for allowing the plate member 10 to depart from the die 12 is not restricted thereto, and the method also comprises holding the glass member at a prescribed position by a holding device other than the injection molding apparatus 1, and moving the injection molding apparatus 1 itself in the vertical direction (for example, the operator lifts up the injection molding apparatus by holding a grip member 13) after completing solidification of the solidified resin member.

While the plate member 10 is clamped with the die 12 and compression member 18 that come close to and remote from the plate surface in the vertical direction, an inner wall is formed so that the solidified resin member 6 protrudes in the vertical direction (or in the approximately perpendicular direction) to the plate surface in the cavity 14 in the die 12 compressed onto the plate member 10. The solidified resin is released from the die 12 by allowing the die 12 to depart from the plate member after solidification ((c) of FIG. 7). In other words, the solidified resin member 6 may be pulled out of the inside of the cavity 14 by allowing the die 12 to depart from the plate member 10 by allowing the injection molding apparatus 1 to move, or by allowing the plate member 10 to depart from the die 12 (for example, the plate member 10 falls down by allowing the compression member 18 to depart from the die 12).

A sliding member 19 as a displacement member is provided as shown in (b) and (c) of FIG. 7 in the die. 12, wherein the displacement member is displaced between a protrusion position that protrudes toward the inside of the cavity from the inner face of the cavity 14 ((b) of FIG. 7) and an waiting position that is waiting without protruding from the inner face of the cavity ((c) of FIG. 7). The molten resin is injected into the die 12 while the sliding member 19 remains to be protruded as shown in (b) of FIG. 7, thereby forming a depression 6a corresponding to the protrusion of the displacement member in the solidified resin member 6 by allowing the molten resin to cool and solidify while the sliding member 19 is protruding. The solidified resin member 6 is released out of the die 12 when the sliding member 19 is positioned at the waiting position.

A solidified resin member having a depression may be formed without dividing the die by constructing the displacement member (actually the sliding member 19) so as to be able to displace in the die 12, thereby permitting the construction to be simple and the number of parts to be reduced. The depression 6a serves, for example, as an engaging member for engaging the solidified resin member 6 with the frame of a vehicle, when the molding object is a vehicle glass to be described hereinafter (see FIG. 9A).

Since the engaging member may be monolithically formed by the method as described above, no other components are needed for providing the engage member, enabling the number of components to be reduced and inventory management to be easy.

In an actual construction, a through hole 17 that penetrates the die 12 from the outside to the inside of the cavity is formed, and the sliding member 19 performs a reciprocating movement between the protrusion position and waiting position in the through hole 17. An actuator that is coupled with the sliding member 19, directly or indirectly through another member, may be provided for driving the sliding member 19, or it may be manually operated by the operator.

A grip member 13 can be provided on the main unit 16 so that the operator is able to grip the main unit 16. The relative position of the resin molding object to the main unit 16 can be adjusted by moving the main unit 16 while holding the grip member 13. While the grip member 13 is held by the operator in this embodiment, the method is not restricted thereto. The grip member may function as another coupling member that is coupled with another main unit transfer device (for example, a robot having a main unit fixing arm that is transferred to an arbitrary position with a servo mechanism) for moving the main unit 16. Such mechanism permits the main unit 16 to be transferred to an arbitrary position with the robot, enabling automation of the machine.

The grip member 13 may have the following configuration. A handle 13a as a grip position by the operator is provided as a rod member formed into a rod, which is formed to be slender so that the axial direction thereof aligns parallel or approximately parallel to the longitudinal direction of the main unit 16. The handle 13a may be formed to be slender so that the axial direction thereof is parallel or approximately parallel to the contact direction between the die 12 and molding object. The contact direction and the longitudinal direction of the main unit 16 are the same with each other in this embodiment. One end of the grip member 13 is fixed to the main unit 16, and the grip member extends to a direction departing from the main unit 16 using the fixed position as a base point. In addition, the grip member is formed into a L-shape so as to be bent in a direction approximately parallel to the longitudinal direction of the main unit 16. Forming the grip member into such shape permits the grip member to be readily processed with a simple structure that can be readily held by the operator. The operator is less fatigued by gripping (or readily gripped) by forming the grip member as described above, when the operator holds the main unit 16 so that the longitudinal direction of the main unit 16 comes to the vertical direction.

While the axial direction of the handle 13a is approximately parallel to the longitudinal direction of the main unit 16 in this embodiment, the handle may be provided so that the axial direction of the handle 13a is perpendicular or approximately perpendicular to the longitudinal direction of the main unit. Constructing the grip member so that the slender handle 13a as a grip position is provided in the direction approximately parallel or perpendicular to the longitudinal direction of the main unit 16 permit the main unit to be readily held by hand, thereby improving operability of the main unit 16 by the operator.

The shape of the grip member 13 is by no means restricted to the shape as described above. Instead, various shapes are possible so long as the shapes are readily conjectured by those skilled in the art (for example a cylindrical, ellipsoidal or rectangular handle, or shapes that roughly fit the palm of the operator upon grasp by the operator). The attachment position of the grip member is also not particularly restricted (for example, various positions such as in the vicinity of the air cylinder 32 or injection cylinder 35).

A switch for switching injection of the resin may be provided at a part of the grip member 13. The switch is electrically connected to the injection air cylinder and clamping air cylinder in order to start injection of the resin by operating the switch. Alternatively, a switch electrically connected to the air cylinder 30 may be provided at the grip member 13 so that the die 12 is opened and closed, or clamped or released, by operating the switch. Such construction permits instruction signals such as start of injection and die gripping to be given to the machine by a short stroke of a finger while the operator is holding the grip member, thereby affording high operability of the machine.

An object having continuously changing flat part and curved part at least at a part thereof may be used as the molding object, and the solidified resin can be adhered on the surface of the flat or curved part. The term "continuous change" means that no steps and incisions are formed on the flat or curved part, and the surface is smooth.

An under coating material 70 may be applied for improving bonding ability of the solidified resin member 6 to the molding object (plate member 10) in the region for bonding the solidified resin member 6 on the molding object (plate member 10) prior to injection of the molten resin. The under coating material may comprise toluene, or other solvents and adhesives, which permit the solidified resin member to be tightly adhered on the molding object.

A hanging member (for example a flexible material such as a flexible metallic wire rope and chain) for hanging the main unit 16 may be provided in any of the main units described above. An eyebolt 80 (see FIG. 1) may be provided for connecting the main unit 16 to the hanging member. The operator can transfer the main unit 16 by holding the grip member 13 while hanging the main unit 16 with a chain as the hanging member. Consequently, the entire weight of the main unit 16 is not required to be supported by the operator (for example, the main unit is hung by the chain from the ceiling, and the operator is able to transfer the resin member molding apparatus 1 as if it is a pendulum), enabling workability to be improved.

A winding device (for example a so-called ceiling crane or balancer having a winding reel for winding the wire rope or chain that enables the position of a hanging object to be freely changed at an arbitrary elevation) may be provided at a base point of the hanging member in order to change the elevation of hanging of the main unit 16 in accordance with the mode of use. The transfer range may be further expanded by making the end of the chain (for example a joint to the ceiling) as the hanging member to be movable (for example a guide rail is provided at the ceiling, and the main unit is allowed to be movable by the guide rail).

The present invention may be applied to the vehicle glass as the plate member 10 formed into a plate shape as the molding object so that the resin member is adhered on at least a part in the vicinity of the outer periphery of the vehicle glass. The following effects may be manifested for attaching the glass when the resin member is directly molded on the vehicle glass. For example, while the vehicle glass is usually bonded to the frame of the vehicle body with an adhesive when the vehicle glass such as the wind shield glass is attached to the vehicle body in the manufacturing process of the vehicle, the glass should be held with some means before the adhesive has an enough bonding strength.

Accordingly, the glass member is usually held using a special holding member such as a clip.

FIGS. 9A and 9B show examples for attaching the glass member (for example a front glass) to the vehicle using the injection molding apparatus 1. As described above, the solidified resin member 6 is formed on the surface of the vehicle glass (plate member 10) as described above, and the glass member is attached to the vehicle by inserting the molded solidified resin member 6 into attachment holes 101 previously formed on the frame of the vehicle 100 for positioning and temporary holding (for example, the plate member 10 is mounted on the frame with the adhesive between them while inserting respective resin members 6 into the attachment holes 101). While the adhesive is previously applied at the portions where the frame contacts the glass, the solidified resin member 6 is locked into the attachment hole 101 formed on the frame until the bonding with the adhesive is secured. Specifically, the solidified resin 6 is engaged with the frame using the depressions 6*i* (see (b) and (c) of FIG. 7) formed on the solidified resin member 6 as engaging parts, and the vehicle glass is held on the frame.

Since the resin member 6 is previously integrated with the vehicle glass (plate member 10), a temporary holding resin member (or called as a temporary holding stopper) usually called as a clip is not required to be managed as a separate component. Consequently, the inventory management process may be reduced while reducing the number of the temporary holding stoppers such as the clips. Moreover, two steps of molding the resin member as the temporary holding stopper and fixing the resin member can be arranged into one step, thereby largely contributing to reduction of the manufacturing time. While the vehicle glass was exemplified as a vehicle component, the vehicle component is not restricted thereto, and the molding object comprises various vehicle components. When the molding object comprises the automobile wind glass as described above, and the resin member is used as a stopper for temporarily holding the wind glass on the vehicle, the bases 93 (the base 93 comprises the perfectly molded resin part 6*b* (see FIGS. 8B and 8C)) of the temporary holding stopper, which is formed with a distance T₁ apart from the periphery of the wind glass WG (plate member 10) to the inside as shown in FIG. 9C, can be formed by being extended along the longitudinal direction (the direction indicated by the arrows in FIG. 9C) of the base 93 by taking advantage of the imperfect filling permissible part. The molded part 6*c* is formed using the imperfect filling permissible part which is extended as described above as shown in FIG. 9C. Consequently, a urethane sealer 90 for hermetically sealing the periphery of the wind glass by bonding to the vehicle body is not narrowed, and appearance from the inside of the vehicle does not become poor. The seal width between the periphery of the wind glass and temporary holding stopper is narrowed by forming a margin for molding the temporary holding stopper at the periphery of the wind glass toward the inside to fail in maintaining hermetic sealing. However, the construction as described above can prevent such drawback. In addition, the margin formed for the temporary holding stopper at the inside of the periphery of the wind glass can be seen from the inside of the vehicle to deteriorate the quality of the vehicle. However, the construction as shown in FIG. 9C can also prevent such drawback.

The following modification may be also employed in the present invention.

Figure 10A:
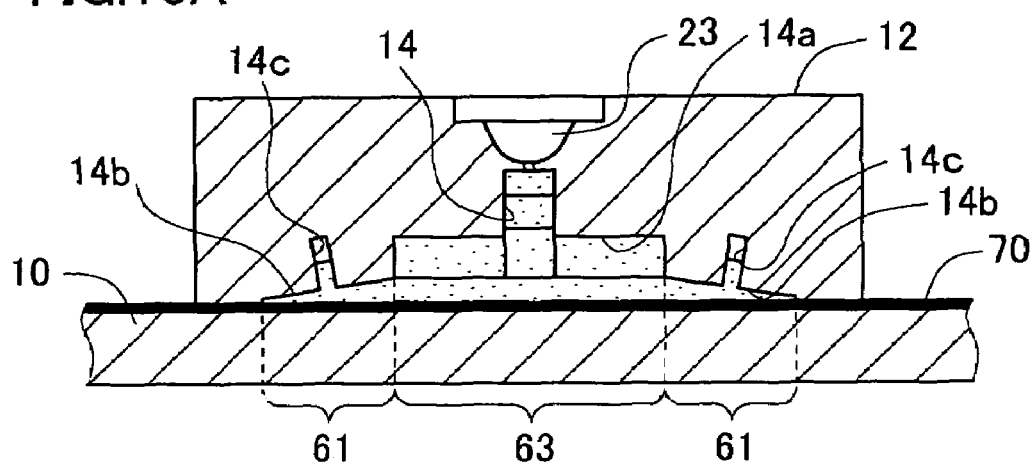
FIG. 10A is a cross section showing an example of modification 1 of the cavity shape illustrated together with a die.
Figure 10B:
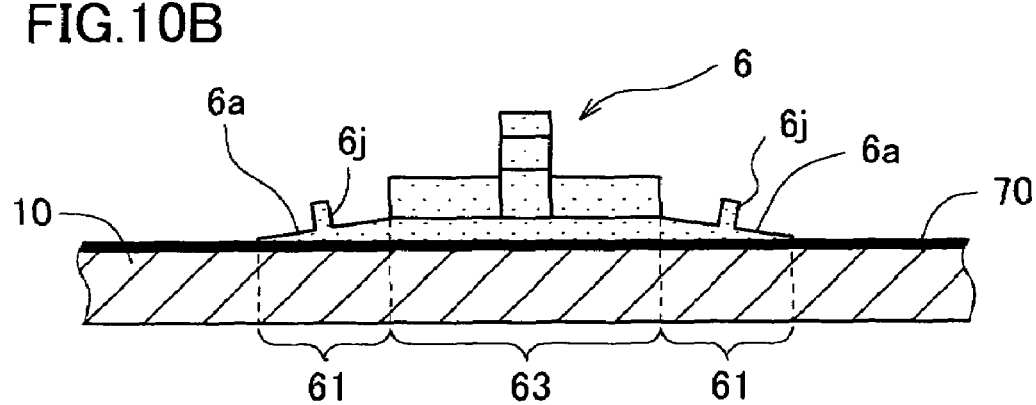
FIG. 10B is a cross section showing the cavity shape after removing the die from the cavity shown in FIG. 10A.

In FIGS. 10A and 10B, the imperfect filling permissible part is provided so that it is not adjoining to the molding object. The cavity shown in FIG. 10A is configured so that projections 6*j* are formed on the outer surface of the solidified resin member 6 after molding as shown in FIG. 10B, and the imperfect filling permissible parts 14*c* are formed at the positions where there is no problem for forming the projections 6*j*. While the perfectly filling part 14*c* is formed so as to communicate the imperfect filling permissible part 14*b* in FIG. 10A, the position causes no problem by forming the projections 6*j*, and the position is not restricted so far as it is remote from the nozzle 23.

Figure 11A:
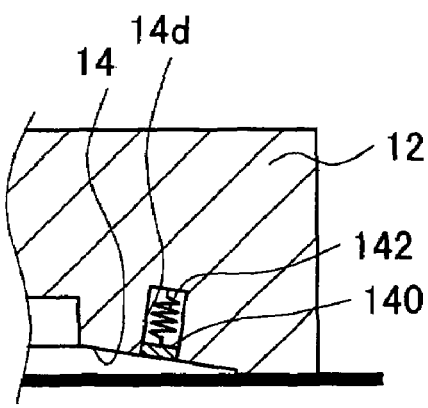
FIG. 11A is a cross section showing an example of a volume variable structure before injecting a resin.
Figure 11B:
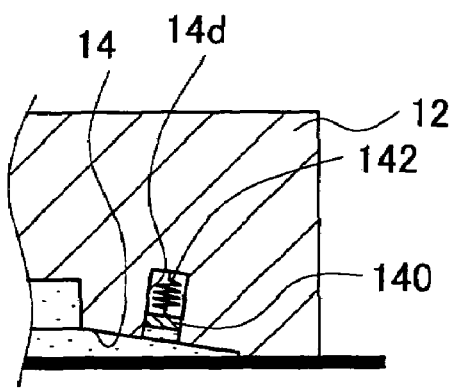
FIG. 11B is a cross section showing an example of a volume variable structure after injecting the resin.

The die may have a variable volume structure by which the volume of the cavity increases in accordance with the pressure of the molten resin in the cavity 14 as shown in FIGS. 11A and 11B. In FIG. 11A, the die 12 has a communication passageway 14*d* communicating with the cavity 14, and a core member 140 is provided to be slidable so as to block the communication hole 14 in the communication passageway 14*d*. The core member 140 is urged with an urging device such as a spring in the direction toward the cavity 14. As shown in FIG. 11B, the core member 140 is compressed by the molten resin having an increased pressure when the pressure of the molten resin is enhanced in the cavity 14, and moves in the direction to increase the volume of the cavity 14 against the urging pressure. A part of the communication passageway 14*d* constitutes a part of the cavity 14 after the movement.

Figure 12A:
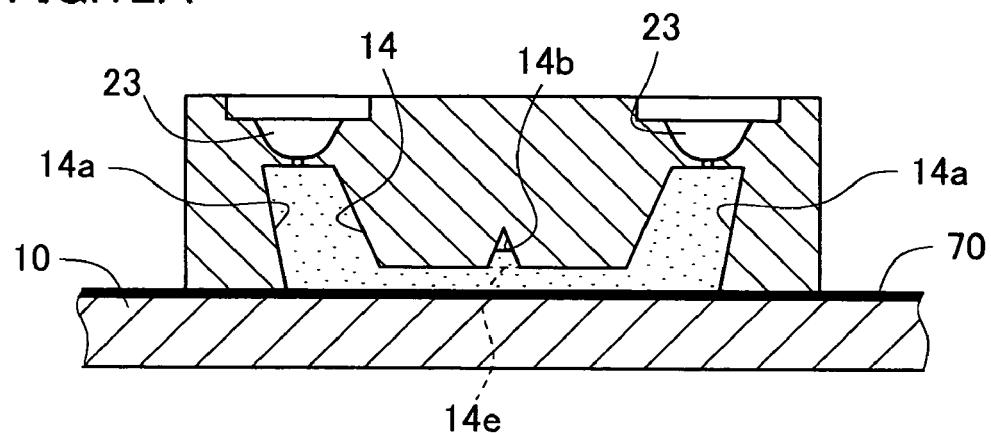
FIG. 12A is a cross section showing an example of modification 2 of the cavity shape illustrated together with a die.

In FIG. 12A, the cavity 14 is configured so that the solidified resin member 6 (FIG. 12B) after molding has a depression 6*f* such as a groove and hole, a molded part 6*g* (the completely molded resin part 6*g*) formed by the completely filled part 14*a* constitutes the periphery of the depression 6*f*, and the molded part 6*c* (the imperfectly molded resin part 6*c*) by the imperfect filling permissible part 14*b* is formed within the depression 6*f* of the solidified resin member 6 (a broken line 14*e* indicates a boundary between the perfectly filling part 14*a* and imperfect filling permissible part 14*b*). This means that the upper face 6*d* and side faces 6*e*, 6*e* of the solidified resin member 6 are perfectly molded, and the molded part 6*c* by the imperfect filling permissible part is located within an area surrounded by an imaginary plane 106 including the upper face 6*d* and side faces 6*e*, 6*e*. This configuration is effective when the external shape should be defined as shown in FIG. 12C. While FIG. 12C shows when an attachment member 110 is attached to the solidified resin member 6, these solidified resin member 6 and attachment member 110 are fitted with each other by forming a groove 110*a* fitting into the external shape of the solidified resin member 6 in the attachment member 110. Since the molded part 6*c* by the imperfect filling permissible part 14*b* does not affect for fitting so long as it is located within the depression 6*f*, the shape of the molded part 6*c* does not cause any problem. While FIGS. 12A to 12C show an example having two nozzles for injecting the molten resin from respective nozzles 23, 23, the number of the nozzles is not restricted thereto, and the die may be constructed to have single nozzle.

Figure 12B:
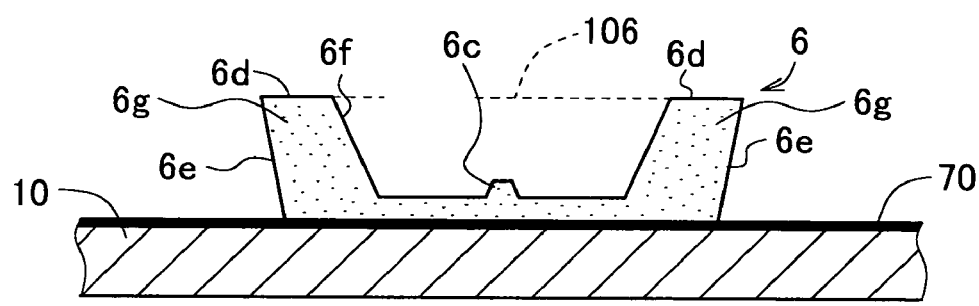
FIG. 12B is a cross section showing the cavity shape after removing the die from the cavity shown in FIG. 12A.
Figure 12C:
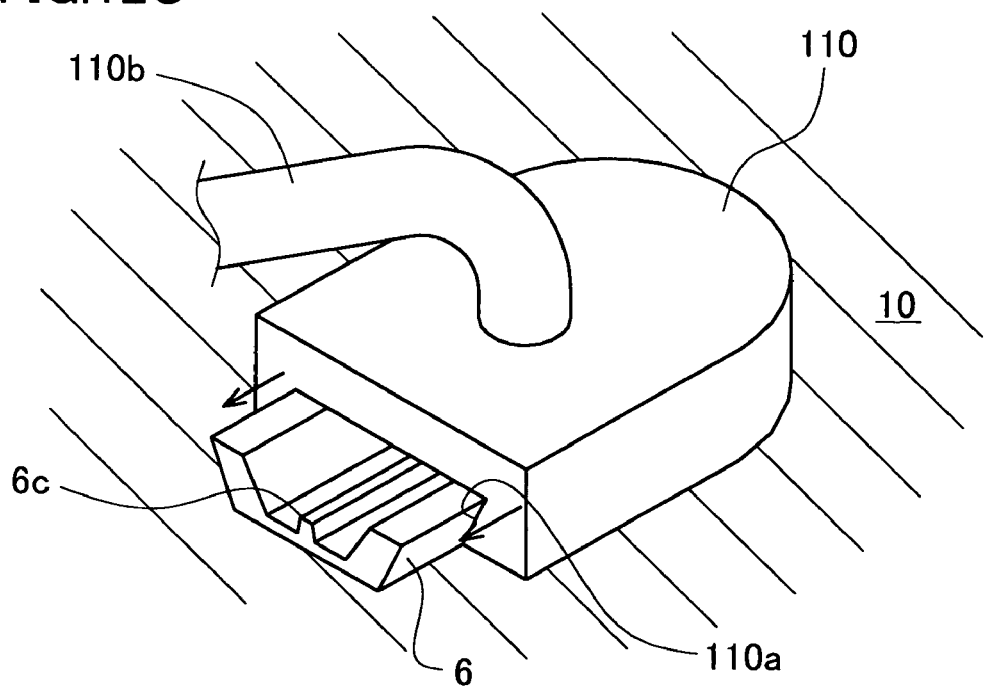
FIG. 12C is a perspective view showing an example for fitting a mounting member into the resin member in FIG. 12B.
Figure 13:
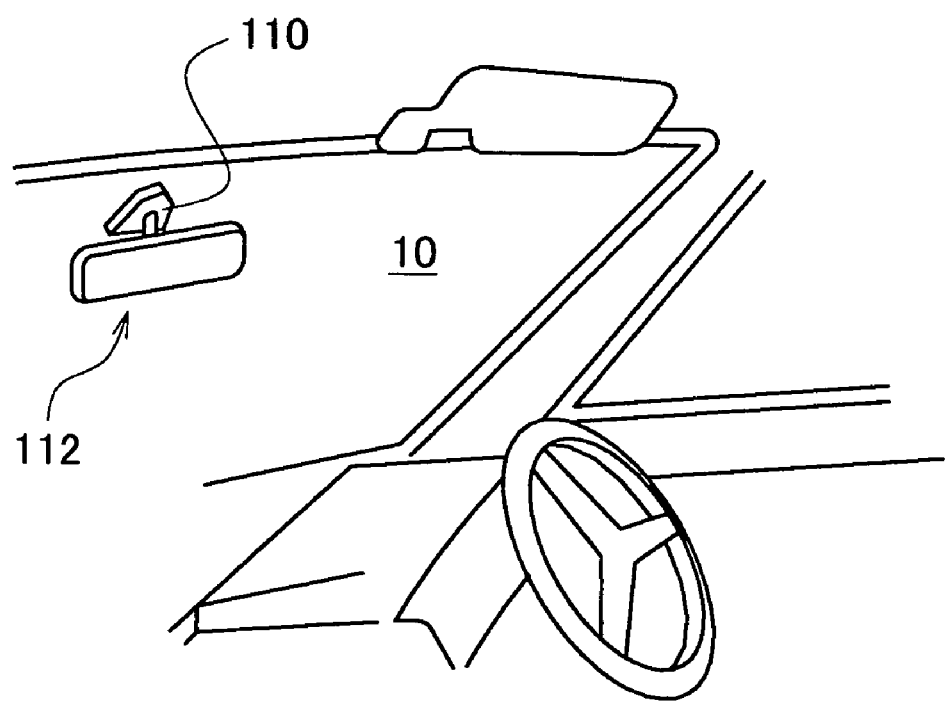
FIG. 13 is a view showing an example of entire construction using the resin member in FIG. 12.

Alternatively, a back mirror 112 may be fixed to an attachment member 110 that is fitted into the solidified resin member 6 by directly molding the solidified resin member 6 onto the vehicle front glass (plate member 10) as shown in FIG. 13, using the method for attaching the attachment member 110 to the solidified resin member 6 molded as shown in FIGS. 12A to 12C. In other words, the attachment member 110 functions as a mirror base (mirror base for attaching the automobile room mirror). The back mirror 112 can be readily attached to the front glass by the method as described above without using the clamping member and adhesive. The mirror base may be fitted into the external shape for attaching the room mirror, thereby avoiding the mirror from being adversely affected for fitting so long as the molded portion using the imperfect filling permissible part is formed within the depression in the solidified resin member. Of course, the clamping member and adhesive may be used together for attachment. The mirror base (attachment member 110) may be formed so that it is freely attachable to and detachable from the solidified resin member 6 (see FIG. 12C).

Figure 14A:
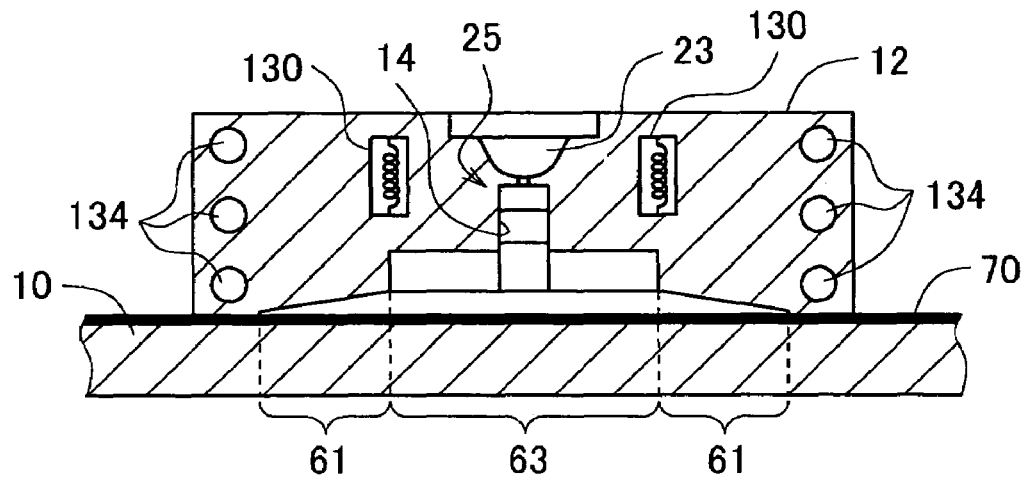
FIG. 14A is a view showing an example of a die comprising a temperature control device.
Figure 14B:
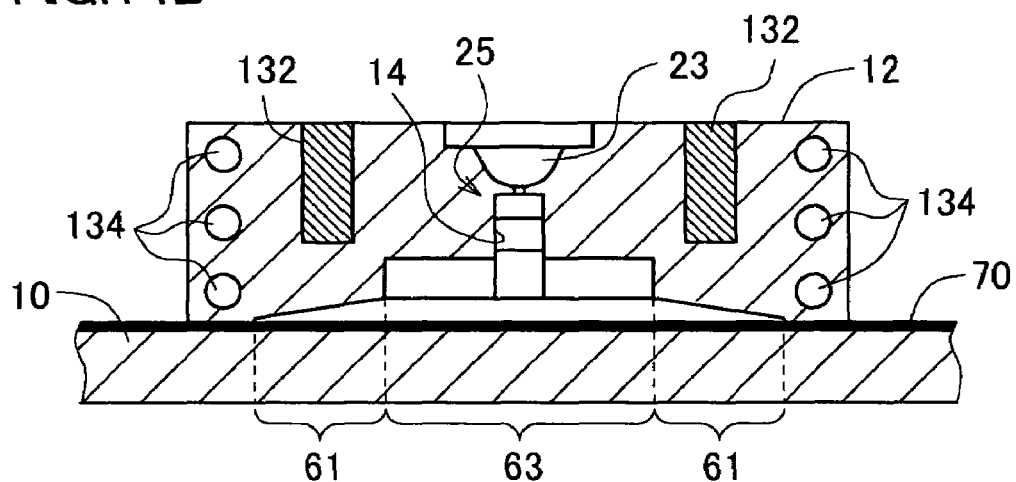
FIG. 14B is a view showing another example of a die comprising a temperature control device.
Figure 14C:
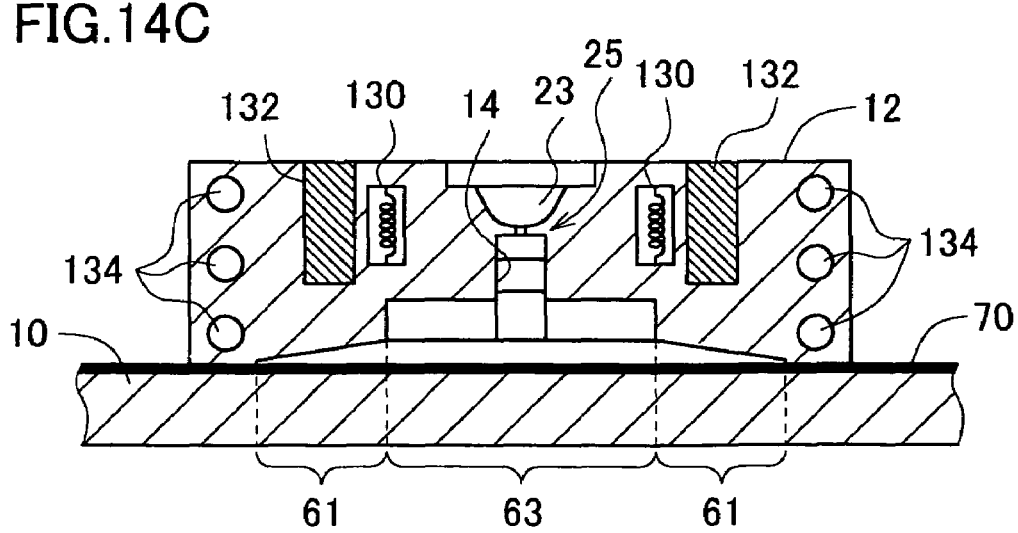
FIG. 14C is a view showing a different example of a die comprising a temperature control device.

Otherwise, the temperature of the communication part 25 between the molten resin injector 15 (FIG. 1) and cavity 14 in the die 12 may be controlled (for example in the range of 100 to 115° C.) with the temperature control device provided around the communication part 25 for injecting the molten resin into the die 12 as shown in FIGS. 14A to 14C. Such temperature control is quite effective for injecting the molten resin at a low injection pressure (350 $kg/cm^2$ or less, desirably 200 $kg/cm^2$ or less) as described above. Different from conventional injection molding using a high injection pressure, it is desirable to maintain fluidity of the molten resin since the molten resin tends to be clogged at near the nozzle at a low injection pressure. Accordingly, good communication state is secured in the vicinity of the nozzle by maintaining fluidity by controlling the molten resin at a prescribed temperature (the temperature that does not affect fluidity of the resin), thereby permitting the injection rate and injection pressure to be controlled with high accuracy even at a low injection pressure while preventing drawbacks such as clogging of the nozzle from occurring.

FIG. 14A shows an example in which a heating device 130 such as an electric heater is provided around the communication part 25, wherein the temperature in the vicinity of the communication part 25 is adjusted in the range of 100 to 115° C. using the heating device 130. A cooling pipe 134 for allowing a coolant (such as water) to flow is provided at the die 12, and the cooling pipe 134 and coolant functions as a cooling device. The temperature in the vicinity of the communication part 25 is adjusted at the temperature described above using the heating device and cooling device. Although detailed descriptions of the temperature control of a given portion using the heater are omitted since the method is well known in the art, various control methods (PID control, on-off control and fuzzy control) may be employed.

A heat insulating device 132 (for example a heat insulating member such as glass wool, air layer and the like) is provided around the communication part 25 as shown in FIG. 14B, and the temperature is suppressed from being decreased by increasing heat accumulation in the vicinity of the communication part 25 by means of the heat insulating device 132. Since a heat is given in the vicinity of the communication part 25 by the molten resin's own heat, the cooling effect of the communication part 25 is effectively suppressed. Fluidity of the molten resin is maintained without decreasing to hardly cause troubles of flowing. The heating device 130 and heat insulation device 132 may be used together as shown in FIG. 14C. While the cooling device is used in FIGS. 14A to 14C, the structure may comprise no such cooling device.

The invention claimed is:

1. An injection molding apparatus comprising:
    a molten resin injector for injecting a molten resin; and
    a die in communication with said molten resin injector, so as to enable injection of molten resin into the die, the die comprising:
        (a) a cavity having a prescribed shape formed in said die, said cavity comprising:
            (i) a perfectly filling part in communication with said molten resin injector, so as enable the perfectly filling part to be perfectly filled with the molten resin, and
            (ii) an imperfect filling permissible part in communication with the perfectly filling part, so as to permit molten resin to flow from the perfectly filling part into the imperfect filling permissible part and imperfectly fill the imperfect filling permissible part, and
        (b) an opening in communication with said cavity,
    wherein, during injection molding using the injection molding apparatus, a molding object is compressed onto said die at a molding object bonding surface, adjacent the opening of the cavity, so as to block the opening of the cavity and define a surface of a solidified resin member formed during injection molding, said molten resin being closely adhered to said molding object by injecting said compressed molten resin into said die, and allowing a solidified resin member to be formed by allowing said molten resin to solidify and adhere to the bonding surface of said molding object.

2. The injection molding apparatus according to claim 1, further comprising:
    (a) an integrated main unit in communication with the molten resin injector, said integrated main unit comprising:
        (i) an injection plunger for injecting said molten resin from said molten resin injector into the perfectly filling part of the cavity of the die by moving the injection plunger in a prescribed direction, and
        (ii) an injection actuator for allowing the injection plunger to move by being directly or indirectly coupled with the injection plunger,
    (b) an injection driving source, separate from the integrated main unit, for feeding an injection driving medium to said injection actuator by being coupled with said injection actuator by means of a flexible first feeding member for feeding the injection driving medium for energizing said injection actuator, and
    said integrated main unit being able to move relative to said injection driving source through said flexible first feeding member.

3. The injection molding apparatus according to claim 2, wherein said injection actuator comprises an injection air cylinder, and said injection driving source comprises injection air feed means for feeding air to said injection air cylinder, said injection air cylinder in communication with the injection air feed means through an injection air duct as said first medium feed member for feeding air by the injection air feed means.

4. The injection molding apparatus according to claim 2,
    wherein said molding object comprises a plate member formed into a plate, and
    wherein said integrated main unit further comprises a clamping mechanism for compressing the plate member onto said die,
    the clamping mechanism comprising a compression member for compressing and holding said plate member, said clamping mechanism being disposed such that the clamping mechanism is able to move relatively close to and apart from said die while clamping said plate member toward the direction of thickness of the plate with the compression member and said die in order to secure said plate member at a position relative to said die.

5. The injection molding apparatus according to claim 4, wherein said clamping mechanism further comprises:
- a clamping actuator directly or indirectly coupled with the compression member for enabling said compression member to move relatively close to or apart from said die; and
- a clamping driving source for feeding a clamping driving medium to the clamping actuator by being coupled to said clamping actuator by means of a flexible second feeding member for feeding the clamping driving medium for energizing said clamp actuator,
- said integrated main unit comprising said clamping actuator so as to be able to move relative to said clamping actuator through said second feeding member.

6. The injection molding apparatus according to claim 5, wherein said clamping actuator comprises a clamping air cylinder, and
- said clamping driving source comprises a clamping air feed means for feeding air to said clamping air cylinder, said clamping air cylinder in communication with said clamping air feed means by means of a clamping air duct as said second medium feed member in order to feed air by the clamping air feed means.

7. The injection molding apparatus according to claim 4, for releasing said solidified resin member adhered to the plate member from said cavity by allowing said plate member to fall down by its own weight as a result of relieving the plate member from clamping by allowing said compression member to leave from said die.

8. The injection molding apparatus according to claim 2, wherein said integrated main unit further comprises:
- a grip member for allowing an operator to grasp the injection molding apparatus.

9. The injection molding apparatus according to claim 8, wherein the grip member is a slender L-shaped rod member having a first end, as a base point, affixed to the integrated main unit, and is bent such that an axial direction thereof aligns parallel to a longitudinal direction of said integrated main unit.

10. The injection molding apparatus according to claim 8, further comprising:
- a connecting member provided for connecting said integrated main unit to a hanging member, wherein the operator can transfer the main unit by holding said grip member while hanging the main unit with the hanging member.

* * * * *